(12) United States Patent
Sheldon

(10) Patent No.: US 6,249,978 B1
(45) Date of Patent: Jun. 26, 2001

(54) FLAIL HEAD FOR A VEGETATION CUTTER

(75) Inventor: John D. Sheldon, Chandler, AZ (US)

(73) Assignee: MTD Products, Inc., Cleveland, OH (US)

( * ) Notice: Subject to any disclaimer, the term of this patent is extended or adjusted under 35 U.S.C. 154(b) by 0 days.

(21) Appl. No.: 09/316,308

(22) Filed: May 12, 1999

(51) Int. Cl.⁷ .................................................. A01D 34/47
(52) U.S. Cl. ................................................ 30/276; 30/347
(58) Field of Search ........................ 30/347, 276; 56/12.5

(56) References Cited

U.S. PATENT DOCUMENTS

| 2,676,448 | * | 4/1954 | Limberger . |
| 4,089,114 | * | 5/1978 | Doolittle et al. . |
| 4,107,841 | * | 8/1978 | Rebhun . |
| 4,118,865 | * | 10/1978 | Jacyno et al. . |
| 4,290,257 | * | 9/1981 | Frantello . |
| 4,300,336 | * | 11/1981 | Miyata . |
| 4,374,465 | * | 2/1983 | Comer . |
| 4,631,828 | * | 12/1986 | Burnett . |
| 5,406,708 | * | 4/1995 | Stephens et al. . |
| 5,430,943 | * | 7/1995 | Lee . |
| 5,491,962 | * | 2/1996 | Sutliff et al. . |
| 5,622,035 | * | 4/1997 | Kondo et al. . |
| 5,722,172 | * | 3/1998 | Walden ............................... 30/276 X |
| 5,791,054 | * | 8/1998 | Bessinger . |
| 5,887,349 | 3/1999 | Walden . |

\* cited by examiner

*Primary Examiner*—Douglas D. Watts
(74) *Attorney, Agent, or Firm*—Brooks & Kushman P.C.

(57) ABSTRACT

A flail head for a vegetation cutter having face-to-face cup shaped central body portions separated by a predetermined distance Symmetrically spaced pivot posts extend between the face-to-face central body portions. A fail blade is pivotably attached to each pivot post. In one embodiment of the flail head, the face-to-face body portions are identical and the pivot posts are formed by mating semi-cylindrical posts formed integrally with each of the central body portions. The flail blades and body portions are made from different plastic materials to prevent the fusion or welding of the flail blades to the posts.

25 Claims, 4 Drawing Sheets

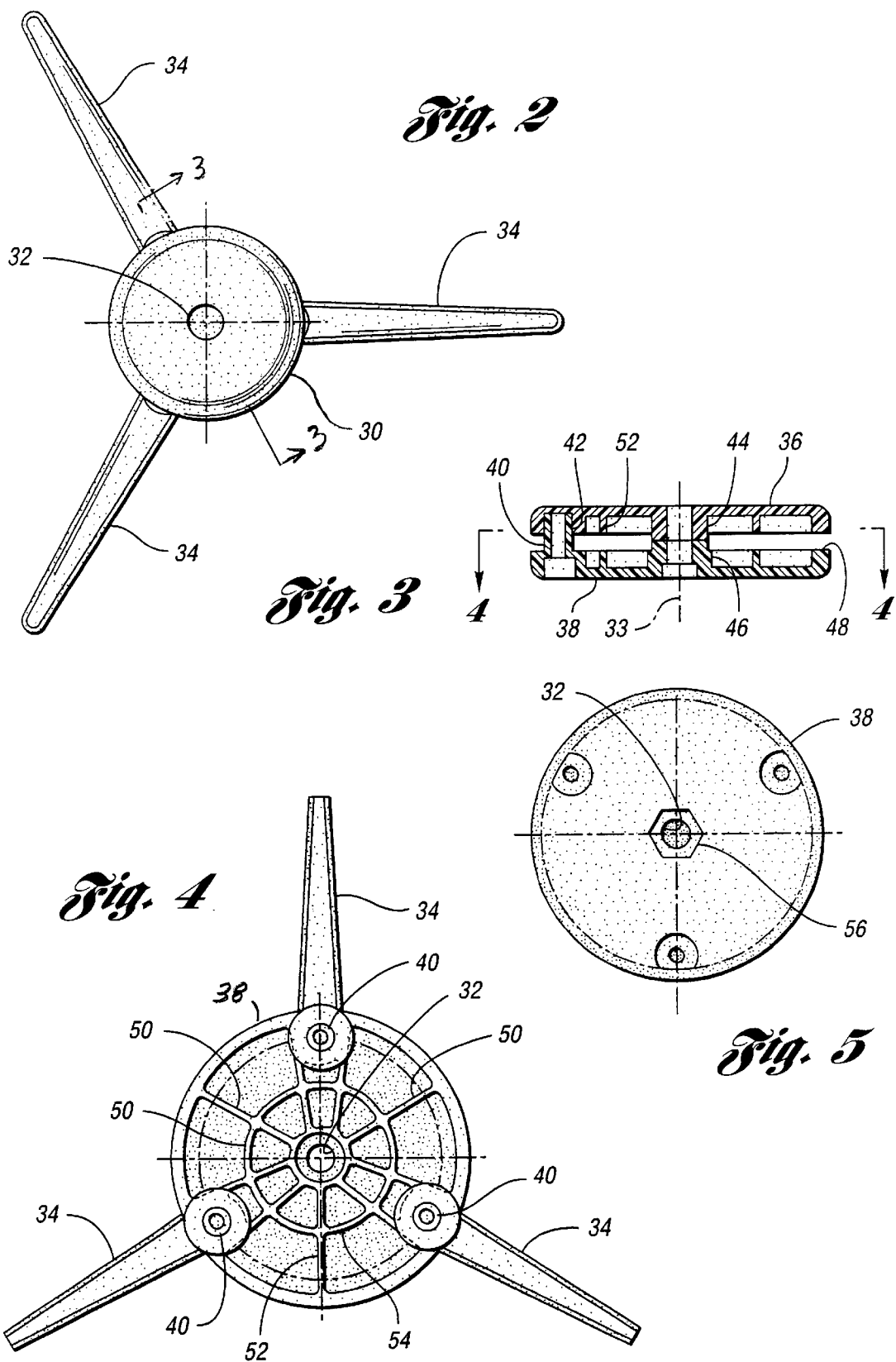

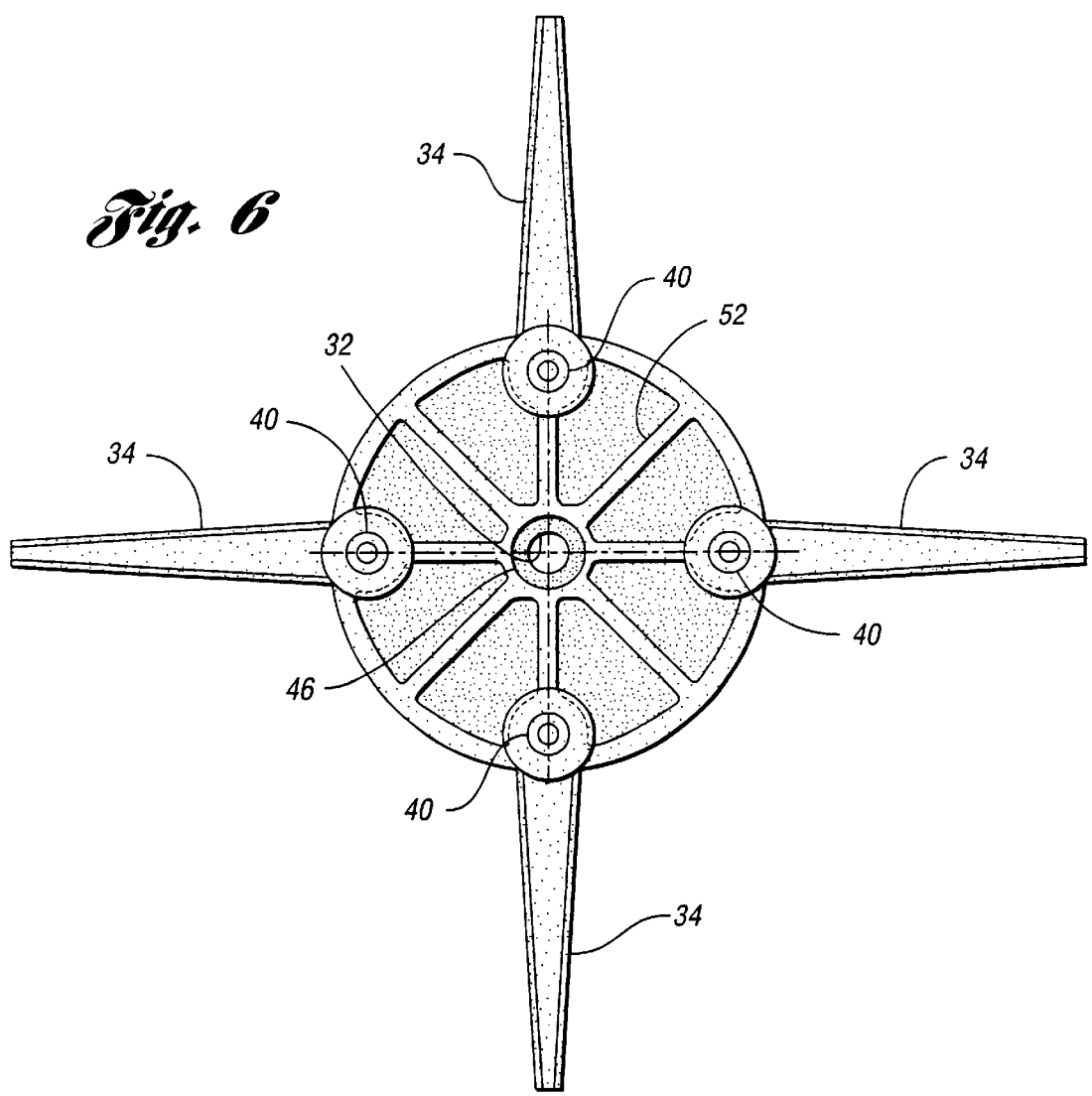

FLAIL HEAD FOR A VEGETATION CUTTER

TECHNICAL FIELD

The invention is related to flail heads for vegetation cutters having molded plastic components.

BACKGROUND ART

The prior art teaches the use of flail head as a suitable alternative to string heads for vegetation cutters. Flail heads such as taught by Lee in U.S. Pat. No. 5,430,943 and Kondo et al. in U.S. Pat. No. 5,622,035 represent the current state of the art in flail heads. These flail heads are multiple component assemblies and the flail blades are individually attached to a central body using bolts or pins respectively. Doolittle et al. in U.S. Pat. No. 4,089,114 teaches a flail head having two integrally formed flail blades which are snap fit onto the end of a conical housing. The two flail blades are not pivotally mounted relative to the conical housing. A flail head having a single pivotable flail blade is taught by Rebhun in U.S. Pat. No. 4,107,841. The single flail blade is pivotally attached to a protrusion formed in a circular support disc. The single blade is only supported on one side and is secured to the protrusion by an enlarged head. The support disc is designed to counter-balance the flail blade. The object of the invention is a flail head which has a minimum number of parts, is easy to manufacture and is safe to the user.

DISCLOSURE OF INVENTION

A flail head for a vegetation cutter having a central body and a series of equally spaced flail blades. The central body consists of two face-to-face bowl shaped body portions. The open faces of the bowl shaped body portions are spatially separated from each other and at least one of the body portions has pivot posts extending between the two body portions. The series of flail blades are pivotally attached to the pivot posts between the two body portions. Abutting central bosses provided on each body portion along with the pivot posts maintain the spatial separation of the two body portions.

In a first embodiment, the pivot posts are provided on one of the body portions and the other body portion has mating bores in which the distal ends of the pivot posts are received. In a second embodiment, the two body portions are identical and each body portion has mating semi-cylindrical posts which when joined from the pivot posts. The two body portions are molded plastic parts molded from a plastic different from the plastic from which the flail blades are molded.

One advantage of the flail head according to the invention is that no tools are required for assembly.

Another advantage of the flail head according to the invention is that the pivot posts are molded into one or both of the body portions eliminating separate pins or bolts.

Still another advantage of the invention is that the central body consists of only two parts.

Another advantage of a second embodiment, the two body portions are identical and may be molded using the same die.

These and other advantages of the flail head according to the invention will become more apparent from reading the detailed description in conjunction with the drawings.

BRIEF DESCRIPTION OF DRAWINGS

FIG. 2 is a top view of the flail head.

FIG. 3 is a cross-section side view of the central body.

FIG. 4 is a bottom view of the lower body portion.

FIG. 5 is a bottom view of the lower body portion.

FIG. 6 is a top view of an alternate embodiment of the lower body portion.

FIG. 7 is a top view of a flail blade.

FIG. 8 is a side view of a flail blade.

BEST MODE FOR CARRYING OUT THE INVENTION

Figure 1:
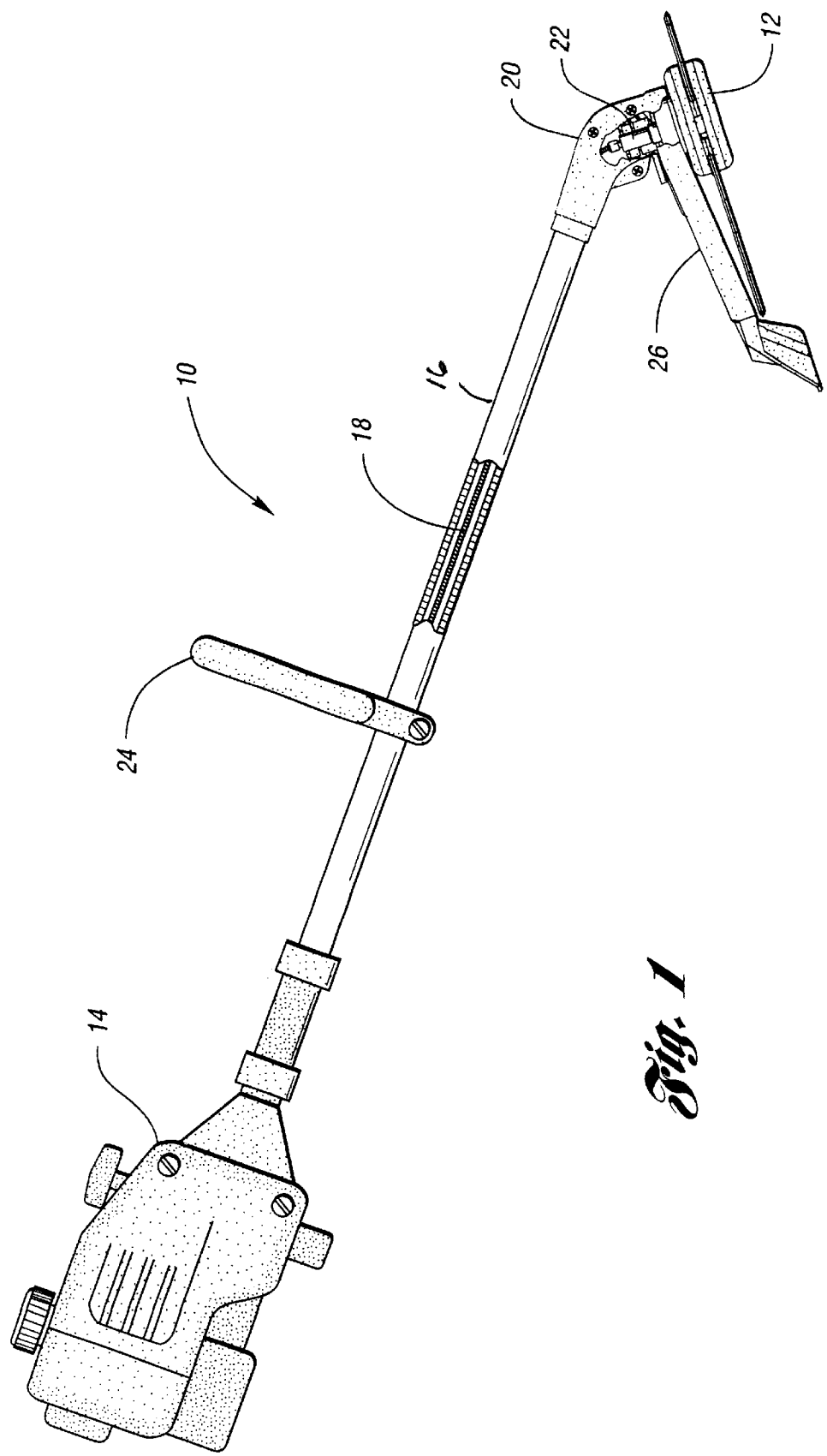
FIG. 1 is a side view of a vegetation cutter embodying the flail head.

A portable vegetation cutter 10 embodying a flail head 12 according to the present invention is shown in FIG. 1. The vegetation cutter 10 has a gasoline powered engine or electric motor 14 whose rotary output is connected to the flail head 12 by means of a drive shaft 18 housed inside a rigid tubular extension 16. A lower housing 20 attached to the lower portion of the rigid extension 16 supports a threaded shaft 22 to which the flail head 12 is attached. The other end of the threaded shaft 22 is connected to the drive shaft 18 and is rotatable therewith. The vegetation cutter 10 may also include a guide handle 24 and a shield 26 to protect the operator from flying vegetation clippings.

FIG. 2 is a top view of the flail head 12. The flail head 12 has a generally circular central body 30 having a mounting aperture 32 into which is received the threaded shaft 22. Pivotally attached to the central body 30 are three flail blades 34. It is recognized that the flail head may include as few as two equally spaced flail blades or more than three flail blades.

FIG. 3 is a cross-sectional view of the flail head 12 taken along section lines 3—3 indicated in FIG. 2. As can be seen in FIG. 3, the central body consists of a bowl shaped upper body portion 36 and a bowl shaped lower body portion 38. Each bowl shaped upper and lower body portions 36 and 38 have an axis of symmetry 33 and open faces arranged in a face-to-face parallel relationship separated by a distance slightly greater than the thickness of the flail blades 34. The open faces of the upper and lower body portions, 36 and 38 respectively, are substantially normal to the axis of symmetry 33. The lower body has three equally spaced pivot posts 40 provided about its perimeter and which extend toward the upper body portion parallel to the axis of symmetry 33. As shown more clearly in FIG. 4, a flail blade 34 is pivotably attached to each of the three pivot posts 40. Returning to FIG. 3, the upper body portion 36 has mating bore 42 into which the distal ends of the pivot posts 40 are received. Preferably, the pivot posts 40 are received in the respective mating bores 42 to join the upper and lower body portions together with a slip fit. Both the upper body portion 36 and the lower body portion 38 have a central bosses 44 and 46, respectively, having selected axial heights such that when abutted to each other an annular slot 48 is formed between the open faces of the upper and lower body portions 36 and 38. The base ends of the flail blades 34 are pivotably mounted to the pivot posts 40 in the annual slot. The upper and lower body portions 36 and 38 are bowl shaped to reduce weight and molding material, but include internal ribbing 50 to increase their structural strength and rigidify.

It would be obvious that the positions of the upper and lower body portions 36 and 38 may be reversed.

FIG. 4 is a top view of the lower body portion 38 taken along section line 4—4 indicated in FIG. 3. The flail blades 34 have been added to FIG. 4 to illustrate their pivotable mounting in the pivot posts 40. The internal ribbing 50 may consist of radial ribs 52 and annular ribs 54 as shown. Alternatively, the internal ribbing 50 may consist of only radial ribs 52 as shown on FIG. 6. Also, as shown in FIG. 6, the flail head 12 may include 4 or more pivot posts 40 for mounting 4 or more flail blades 34 rather than 3 as discussed relative to FIGS. 2–4.

FIG. 5 is a bottom view of the bottom portion body 38. A hexagonal detent 56 is provided about the mounting aperture 32. The hexagonal detent 56 receives a hexagonal mounting nut (not shown) which affixes the flail head 12 to the threaded end of the threaded shaft 22.

The details of the flail blade 34 are shown on FIG. 7 and 8. As shown, the flail blade 34 has an annular base 58 having substantially parallel flat faces 60 and 62. The annular base 58 is the thickest region of the flail blade. A triangular shaped blade portion 64 extends radially from the annular base 58 and has beaded edges 66 and 68 for increased rigidity and strength.

Figure 9:
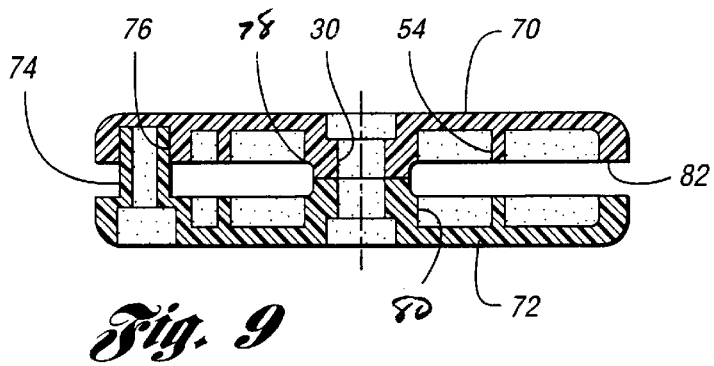
FIG. 9 is a cross-sectional view of an alternate embodiment of the central body.
Figure 10:
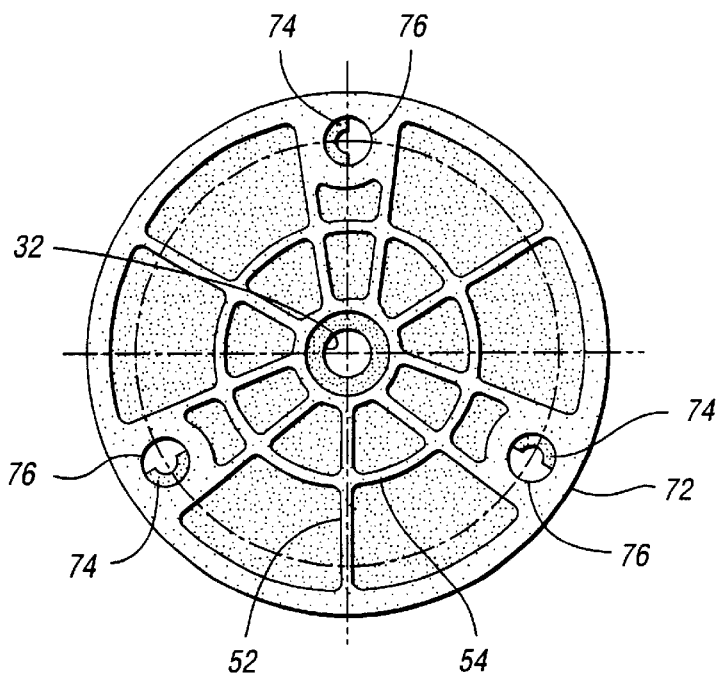
FIG. 10 is a top view of the lower body portion of the alternate embodiment.

An alternate embodiment of the flail head is shown in FIGS. 9 and 10. In this embodiment, the upper and lower body portions 70 and 72 are identical bowl shaped members. Each pivot post 40 consists of semi-cylindrical post 74 on each of the identical body portion 70 and 72 which when mated, form a cylindrical pivot post 76 comparable to pivot post 40. The distal ends of the semi-cylindrical posts are received in semi-cylindrical wells 76 provided adjacent to the open face of each cylindrical post. As in the embodiment shown on FIG. 3, when central bosses 78 and 80 abut, an annular slot 82 is formed between the upper and lower bodies, 70 and 72 respectively, in which the flail blades 34 are pivotably received.

Preferably, the central body 30 and the flail blades 34 are made from different structural plastic materials to prevent the flail blades 34 from welding or fusing on the pivot posts 40. In a preferred embodiment, the central body is made from a 30 percent glass filled nylon material and the flail blades are made from an impact modified glass filled polyester material.

Figure 11:
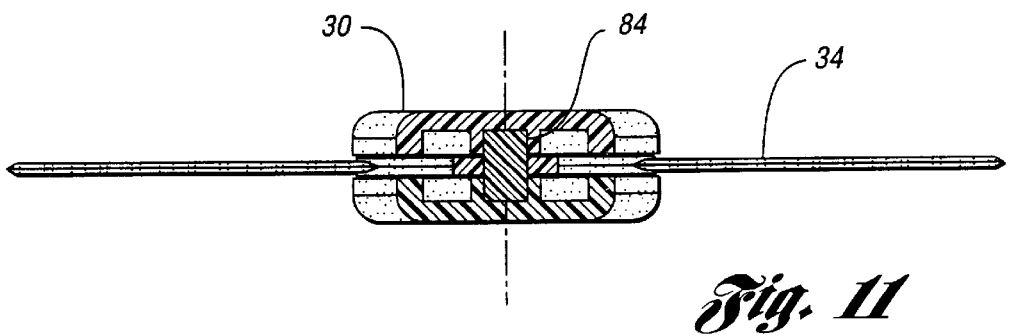
FIG. 11 is a partial cross-section showing a metal sleeve on the pivot post.

To further reduce excessive abrasion of the pivot post by the flail blades, a metal sleeve 84 such as a bronze sleeve may be inserted over the pivot posts 40 as shown on FIG. 11.

While embodiments of the invention have been illustrated and described, it is not intended that these embodiments illustrate and describe all possible forms of the invention. Rather, the words used in the specification are words of description rather than limitation, and that various changes may be made without departing from the spirit and scope of the invention.

What is claimed is:

1. A flail head for a vegetation cutter comprising:
   a first bowl shaped body portion having an open face and an axis of symmetry, the first body portion having a central boss and a mounting aperture provided therethrough concentric with the axis of symmetry;
   a second bowl shaped body portion having an open face facing the open face of the first body portion and spatially separated from the open face of the first body portion by a predetermined distance, the second body portion having an axis of symmetry concentric with the axis of symmetry of the first body portion and a central boss abutting the central boss of the first body portion;
   a plurality of pivot posts provided in of the first and second body portions for connecting said first and second body portions about the perimeter of said first and second body portions;
   at least one flail blade pivotally connected to each pivot post between the open faces of the first and second body portions, the flail blade having a thickness less than the predetermined distance; and
   wherein the first and second body portions are substantially identical to each other and are provided with a plurality of semi-cylindrical pivot posts, and the faces of the semi-cylindrical pivot posts provided in the first body portion abut the faces of the semi-cylindrical pivot posts provided in the second body portion so as to form a plurality of cylindrical pivot posts.

2. The flail head of claim 1 wherein the pivot posts are integrally molded in one of the first and second body portions and the other of the body portions has a plurality of bores for receiving the distal ends of the pivot posts.

3. The flail head of claim 1 wherein the first and second body portions have internal ribs to increase their structural strength and rigidity.

4. The flail head of claim 1 wherein the flail blades are made from a structural plastic different from the structural plastic from which the first and second body portions are made.

5. The flail head of claim 4 wherein the first and second body portions are made from a glass filled nylon and the flail blades are made from a glass filled polyester.

6. A vegetation trimmer comprising:
   an elongate tubular boom having two ends;
   a motor attached to one end of the tubular boom and having a rotary output coaxially aligned with the tubular boom;
   a rotary output shaft rotatably mounted on the end of the elongate tubular boom opposite the motor;
   an elongate drive shaft affixed at one end to the motor output extending through the tubular boom and attached at the other end to a rotary output shaft; and
   a flail head affixed to the rotary output shaft, the flail head including:
      a cup shaped first body portion having an axis of symmetry and an open end defining a first plane normal to the axis of symmetry, the first body portion further having a central boss and at least two equally spaced integrally molded semi cylindrical pivot posts extending outwardly from the first plane substantially parallel to the axis of symmetry;
      a cup shaped second body portion disposed adjacent to the first body portion, the cup shaped second body portion having an axis of symmetry concentric with the axis of symmetry of the first body portion and an open end facing the open end of the first body portion and defining a second plane parallel to and spatially separated from the first plane, the second body portion having a central boss and at least two equally spaced integrally mold semi cylindrical pivot posts wherein the first and second body portions are substantially identical to each other and the plurality of semi-cylindrical pivot posts are each provided with a face, and the faces of the semi-cylindrical pivot posts provided in the first body portion abut the faces of the semi-cylindrical pivot posts provided in the second body portion so as to form a plurality of cylindrical pivot posts and wherein a mounting aperture is provided through the first and second body portions concentric with the axis of symmetry for attachment to the rotary output shaft; and at least one flail blade pivotally commented to each cylindrical pivot post between said first and second body portions.

7. The flail head of claim 6 wherein the axial length of the first and second bosses is selected such that the abutment of the first and second bosses controls the separation of the first and second planes.

8. The flail head of claim 6 wherein the structure of each of the first and second body portions includes internal ribs to increase their structural strength and rigidity.

9. The vegetation trimmer of claim 6 wherein at least one of the first and second body portions has a hexagonal detent provided coaxial with the axis of symmetry to receive a nut attaching the flail head to a threaded shaft of the vegetation trimmer.

10. The flail head of claim 6 further including a metal sleeve circumscribing each pivot post.

11. The flail head of claim 6 wherein the first and second body portions are injection molded structural plastic components.

12. The flail head of claim 11 wherein the flail blades are made from a plastic different from the plastic from which the first and second body portions are made.

13. The vegetation trimmer of claim 12 wherein the flail blades are made from a glass filled polyethylene and the first and second portions are made from a glass filled nylon.

14. A flail head for a vegetation cutter comprising:

two substantially identical body portions oriented in a face-to-face arrangement and spatially separated from each other, each body portion having a cup shaped portion and having an axis of symmetry, the open end of each body portion defining a plane normal to the axis of symmetry, each body portion further having a central boss and at least two equally spaced semi-cylindrical posts extending outwardly substantially parallel to the axis of symmetry and at least two semi-cylindrical wells adjacent to the semi-cylindrical posts, each semi-cylindrical well receiving a respective one of the distal ends of semi-cylindrical posts, the adjacent semi-cylindrical posts combining to form at least two pivot posts extending through the space between the two face-to-face identical body portions; and a flail blade having a predetermined thickness, pivotably attached to each pivot post.

15. The flail head of claim 14 wherein at least a portion of the cup shaped portions of the substantially identical body portions are separated at a distance substantially equal to the predetermined thickness of the flail blade.

16. The flail head of claim 14 wherein the axial height of the central boss in each of the identical body portions is selected to control the separation of the cup shaped portions of the substantially identical body portions.

17. The flail head of claim 14 wherein each body portion includes internal ribs to increase the structural strength and rigidity of the body portion.

18. The flail head of claim 14 wherein at least one of the identical body portions has a hexagonal detent for receiving a nut fastening the flail head to the vegetation cutter.

19. The flail head of claim 14 further including a metal sleeve circumscribing each pivot post.

20. The flail head of claim 14 wherein said substantially identical body portions are injection molded structural plastic components.

21. The flail head of claim 14 wherein the substantially identical body portions are made from structural plastic.

22. The flail head of claim 21 wherein the substantially identical body portions are made from glass reinforced nylon and the flail blades are made from glass reinforced polyethylene.

23. The flail head of claim 14 wherein said semi-cylindrical posts and said semi-cylindrical wells form three spatially separated pivot posts.

24. The flail head of claim 1 wherein the first and second body portions are injection molded structural plastic components.

25. The flail head of claim 21 wherein the flail blades are made from a plastic material different from the plastic material which the substantially identical body portions are made.

* * * * *

UNITED STATES PATENT AND TRADEMARK OFFICE
CERTIFICATE OF CORRECTION

PATENT NO.   : 6,249,978 B1
DATED        : June 26, 2001
INVENTOR(S)  : John Sheldon Page 1 of 1

It is certified that error appears in the above-identified patent and that said Letters Patent is hereby corrected as shown below:

<u>Column 5, claim 6,</u>
Line 3, delete "commented" and insert -- connected --.

<u>Column 6, claim 25,</u>
Line 39, after "material" [second instance] insert -- from --.

Signed and Sealed this

Nineteenth Day of March, 2002

Attest:

JAMES E. ROGAN
*Director of the United States Patent and Trademark Office*

*Attesting Officer*